United States Patent
Stanesic

(10) Patent No.: US 6,817,649 B1
(45) Date of Patent: Nov. 16, 2004

(54) ONE PIECE MOLDED FLOOR MAT FOR FRONT FLOOR AREAS OF VEHICLE

(75) Inventor: J. Matthew Stanesic, West Chester, OH (US)

(73) Assignee: Lund International, Inc., Anoka, MN (US)

( * ) Notice: Subject to any disclaimer, the term of this patent is extended or adjusted under 35 U.S.C. 154(b) by 0 days.

(21) Appl. No.: 10/390,743

(22) Filed: Mar. 19, 2003

(51) Int. Cl.⁷ .............................................. B62D 25/20
(52) U.S. Cl. .................................................. 296/97.23
(58) Field of Search ........................ 296/209, 38, 39.1, 296/75, 97.23; 15/215, 216; D12/203

(56) References Cited

U.S. PATENT DOCUMENTS

| | | | | |
|---|---|---|---|---|
| D180,405 S | * | 6/1957 | Jackler | D12/203 |
| 3,129,972 A | * | 4/1964 | Vodra | 296/97.23 |
| 3,337,258 A | * | 8/1967 | Steinberg | 296/97.23 |
| D208,764 S | * | 10/1967 | Dudley | D12/203 |
| 3,401,975 A | * | 9/1968 | Oger | 296/97.23 |
| 4,579,764 A | | 4/1986 | Peoples, Jr. et al. | |
| 4,828,898 A | | 5/1989 | Bailey | |
| 4,921,742 A | | 5/1990 | Altus | |
| 5,149,572 A | * | 9/1992 | Gaggero et al. | 428/43 |
| 5,830,560 A | * | 11/1998 | Koa | 428/192 |
| 5,891,546 A | | 4/1999 | Sherman | |
| 6,155,629 A | * | 12/2000 | Sherman | 296/97.23 |
| 2002/0079717 A1 | * | 6/2002 | Leimer | 296/97.23 |

OTHER PUBLICATIONS

"JC Whitney", Jan. Catalog No. 586A, Jan. 16, 1996.*

* cited by examiner

*Primary Examiner*—Jason Morrow
(74) *Attorney, Agent, or Firm*—Charles R. Wilson

(57) ABSTRACT

A molded full cover floor mat is contoured and shaped for placement in the front compartment area of a truck or similarly configured vehicular floor area. The mat is one piece and is made from a pliable plastic material. It has a central tray-like area in both a driver foot well area and a front passenger foot well area to retain debris. It further has a multi-faceted retention system to hold the mat in place during use. The mat is shaped to abut against door sills and seat attachment hardware and further has retention tabs on lateral edges which interact with the vehicle's door sills.

7 Claims, 3 Drawing Sheets

ONE PIECE MOLDED FLOOR MAT FOR FRONT FLOOR AREAS OF VEHICLE

FIELD OF THE INVENTION

This invention relates to molded floor mats designed to overlie a full front carpeted floor area of a vehicle. More particularly, the invention relates to molded floor mats with a multi-faceted retention system to retain the mat in place, particularly when used in a pickup truck.

BACKGROUND OF THE INVENTION

Pickup trucks are very popular with the general driving public. They are often used as a general purpose vehicle. Their owners tend to want all the amenities found in sedan and coupe automobiles. Pickup trucks with carpeted floor surfaces are prevalent. The floors of such vehicles tend to be flat. Vacuuming away loose debris in such a flat area is relatively easy. However, the truck's owner is also often concerned with more permanent stains and surface wear. Floor mats are needed to meet the concern.

Producing contoured floor mats at a reasonable cost to neatly fit a floor of a pickup truck is commercially feasible. Holding them in place under normal use conditions is more difficult. Many retention means of various designs are available. Most are designed for use with carpeted floor mats intended for placement in an automobile's deep foot well area which is already carpeted. A retention system designed specifically for pickup trucks, though, is needed. Any retention system must securely hold the floor mat in place. Ready removal of the floor mat for thorough cleaning or replacement is also a desired, though not necessary feature.

There has now been developed a floor mat primarily for use in pickup trucks which fits in place and can be made to stay in place. In accord with a demonstrated need, the floor mats of this invention are contoured to neatly fit a full front floor compartment area of a truck and have a multi-faceted retention system to securely, but removably, hold them in place.

SUMMARY OF THE INVENTION

A molded floor mat is dimensioned to fit into the front floor compartment area of pickup trucks and other vehicles with similarly configured floors. The floor mat is a one piece pliable plastic mat molded to a contour and shape which snugly fits into the truck's driver side foot area, front passenger side foot area and center hump area therebetween. One lateral edge of the mat is shaped to abut against a driver door sill. An opposed lateral edge is shaped to abut against a front passenger door sill. A back edge of the mat is shaped to abut against seat attaching hardware of the vehicle. Front areas of the mat are vertically inclined to overlie a firewall of the truck. Raised interior walls near the lateral edges are also molded into the mat to create tray-like central areas for debris retention purposes. Further, retention tabs extend outwardly from the lateral edges to fit underneath the door sills. The shaped edges interacting with structural features of the vehicle and the retention tabs create a multi-faceted retention system.

DETAILED DESCRIPTION OF THE INVENTION

The floor mats of this invention are intended for use primarily in pickup trucks. They are also useful in the carpeted full front floor compartment areas of all vehicles having substantially flat floors which extend on each lateral side to a door sill. These vehicles include pickup trucks as well as vans and sport utility vehicles. Different makes and models of such vehicles have different contoured and shaped floor compartment areas. However, all lack a floor well and instead have the substantially flat floor which lies in substantially the same plane as a door sill.

The invention is described with reference to the drawings wherein a particular contoured and shaped floor mat intended for one commercially available pickup truck model is shown. It should be understood that other floor mats designed for use in other vehicles of the type envisioned in this invention are contemplated, it being only necessary to properly contour and shape the mats based on the particular vehicle's interior lay-out.

Figure 1:
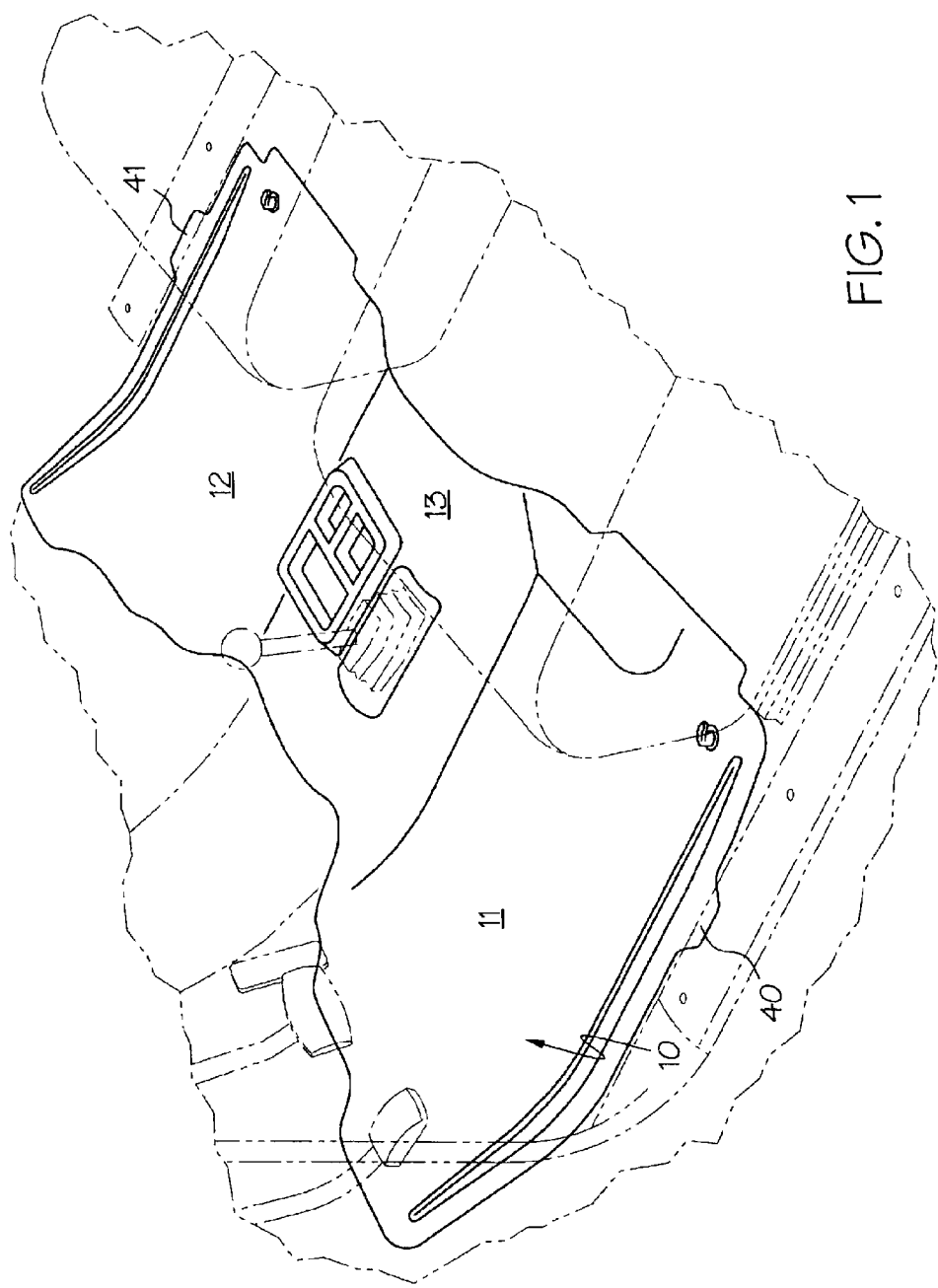
FIG. 1 is an environmental view in perspective showing a floor mat of the invention in position in a front floor compartment area of a truck.
Figure 2:
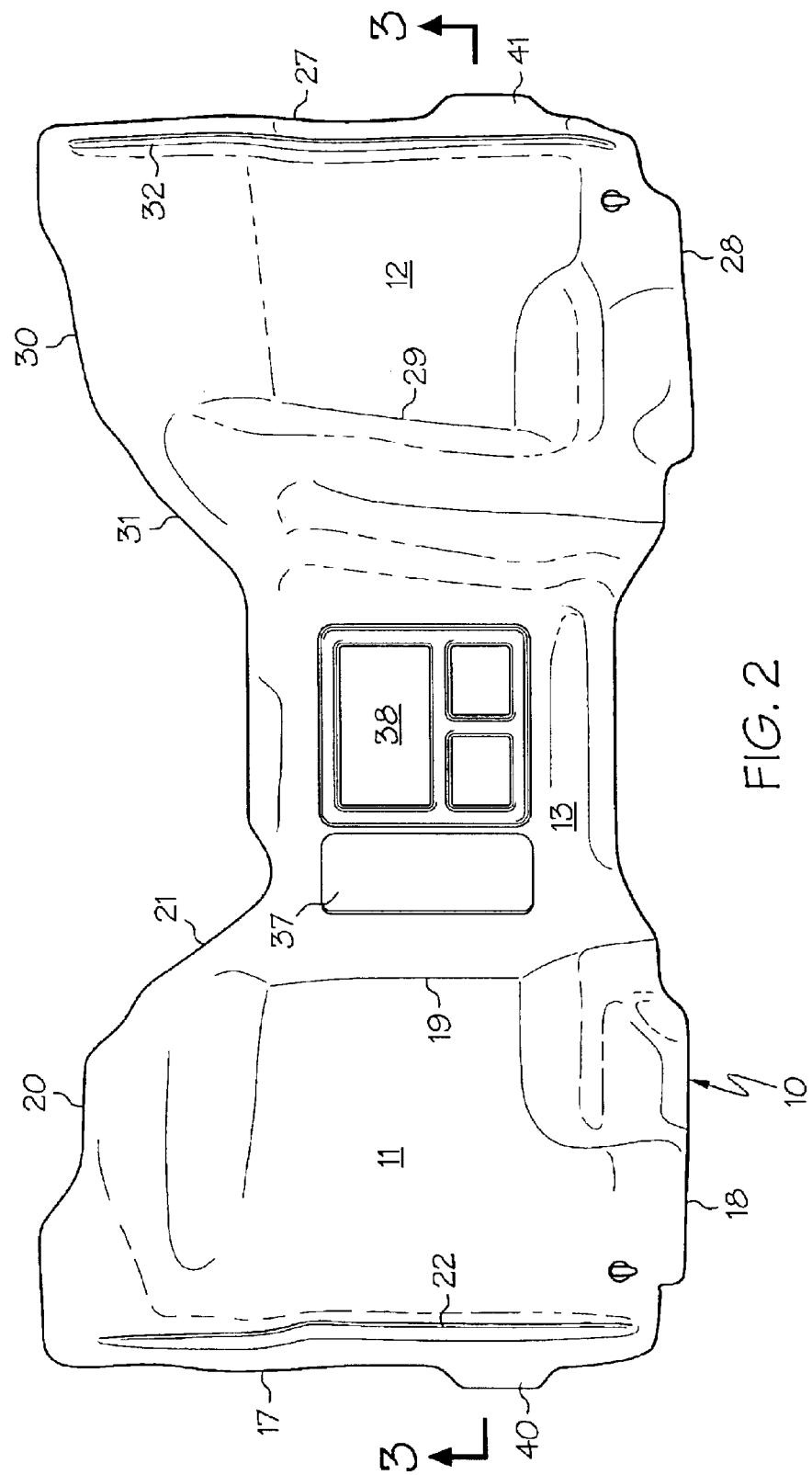
FIG. 2 is a top plan view of the floor mat of FIG. 1.
Figure 3:
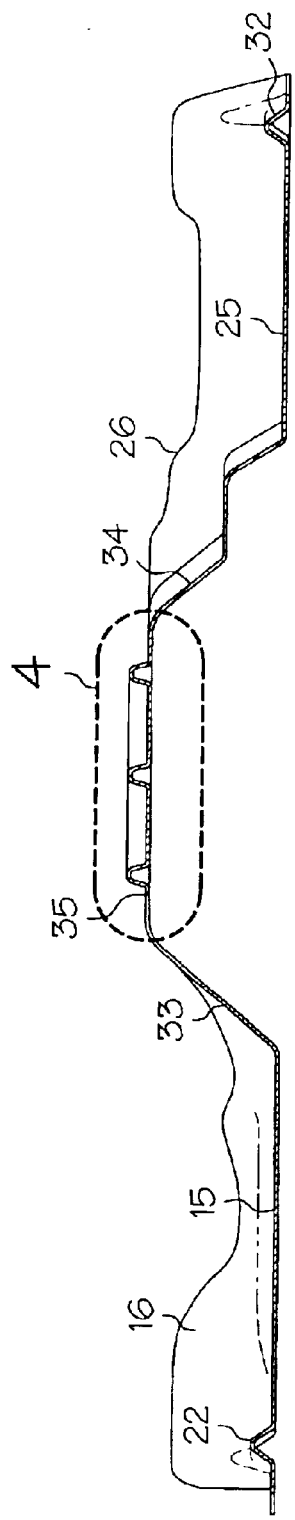
FIG. 3 is a side elevation view in section taken along line 3—3 of FIG. 2.
Figure 4:
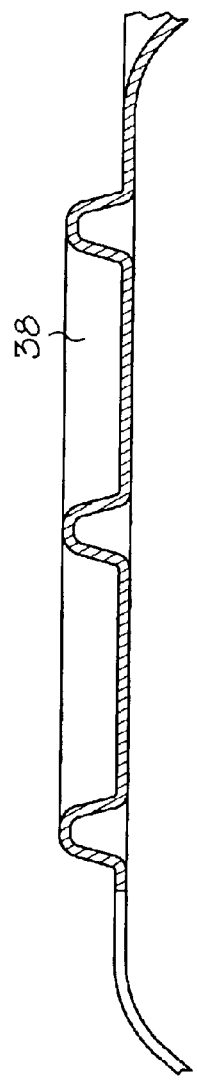
FIG. 4 is an enlarged side elevation view in section of a coin tray portion of the floor mat taken along line 4 of FIG. 3.

With reference to FIGS. 1–3, there is shown a floor mat 10 of the invention. The contour and shape of the depicted floor mat 10 allows it to fit into the full front compartment area of the pickup truck (shown in phantom). The floor mat 10 is one piece. It is made from a pliable plastic material and is molded to a contour which snugly fits into and covers the driver's foot area, the front passenger's foot area and a center hump in between the two foot areas. The mat comprises three contiguous sections. A driver foot area section 11, a front passenger foot area section 12 and a hump area section 13 connecting the two foot area sections create the one piece mat. The three areas are molded to closely follow the contours of the respective underlying floor areas and further are dimensioned to interact with existing truck structures, such as door sills, seat attaching hardware and firewalls. The three area sections and edges which are a part of a multi-faceted retention system are described in detail in the following paragraphs.

The driver foot area section 11 has a substantially flat base 15 with a front portion 16 which is shaped to slope upwardly to directly overlie an upwardly sloped firewall of the pickup truck. The base 15 and front portion 16 of the floor mat 10 both lie directly on the truck's carpeted floor surfaces. The driver foot area section 11 is defined by a first lateral edge 17 which abuts against the driver door sill of the truck, a back edge 18 which abuts against seat attachment hardware of the truck, an interior mold crease 19 where the surface of the mat's base abruptly rises to accommodate the truck's center hump area and a front edge 20 opposed to the back edge 18. A front edge segment 21 abuts a vertical wall of the center hump and, to a limited extent, helps to hold the floor mat from moving forwardly. A raised wall 22 molded into the mat near and substantially parallel the first lateral edge 17 rises above the flat base 15 to create a tray-like central area in the section 11. As best seen in FIG. 3, the raised wall 22 has two walls which rise about one inch to about two inches each from the base 15 to meet at a peak to form a double wall. As apparent in FIGS. 1 and 2, other portions of the mat are contoured to mate with underlying contoured areas of the vehicle's floor surface.

The front passenger foot area section 12 is configured similarly to the driver foot area section 11. It has a flat base 25 and an upwardly sloped front portion 26, both of which lie directly on an underlying carpeted floor of the truck. The front passenger foot area section has a second lateral edge 27, a back edge 28, an interior mold crease 29 and a front edge 30 with a front edge segment 31, corresponding to like components of the driver foot area section 11. It too has a raised wall 32 molded into the mat near the second lateral edge, again to create a central tray-like area to catch and retain debris.

The hump area section 13 lies directly over the center hump of the truck. It has a first wall 33 which rises from the interior mold crease 19 of the driver foot area section, a second wall 34 which rises from the interior mold crease 29 of the passenger foot area section and a substantially horizontal top wall 35 therebetween. It further has a cut-out 37 to accommodate a gear shift. An optional tray 38 is molded into the hump area section for coins and the like.

As evident in FIG. 1, the lateral edges and back edge of the floor mat 10 effectively trap the mat in place. The lateral edges abutting against the opposed door sills prevent any substantial side to side movement. The back edge abutting against two sets of seat attaching hardware prevents any rearward movement. The upwardly sloped front portions inhibit forward movement. The raised hump area section of the mat also contributes to the prevention of side to side mat movement.

Again with reference to FIGS. 1 and 2, a first retention tab 40 extends outwardly from the lateral edge 17 of the driver foot area section 11. Similarly, a second retention tab 41 extends outwardly from the lateral edge 27 of the front passenger front foot area section 12. The two retention tabs are each about two inches to about eight inches long and about one inch to about two inches in width. Sufficient flexibility in the floor mat, including the retention tabs, allow the tabs to be bent downwardly and pushed under the door sills. These tabs further add to retention of the floor mat in place.

A thermoplastic material is used to make the floor mat. The thermoplastic plastic can be molded to a desired deeply contoured form and such form be retained. It can then be cut manually or by machine to a desired shape. Examples of suitable thermoplastics include polymers of olefins such as ethylene and propylene, copolymers of ethylene with ethylenically unsaturated monomers, e.g. ethylenevinyl acetate, acrylates, polyvinyl chlorides and styrene-butadiene polymers. The thermoplastic material is capable of being softened at a temperature of from about 190 degrees F. to about 240 degrees F. to become readily moldable. A thermoplastic polyolefin is preferred because of its pliability and durability. Thermoplastic plastics used in the invention are commercially available in a range of colors.

The resultant molded floor mat is a dimensionally stable article having a desired contoured shape. Preferably, though not shown, the surface of the floor mat at least in the foot area sections is textured to give a more non-slip surface to prevent foot sliding. As should be evident, the floor mat is a one piece construction. No seams, overlap areas, etc. appear in the mat. Most importantly a high quality floor mat is efficiently produced. The floor mat fits onto the carpeted floor compartment areas of the pickup truck with no substantial folds or wrinkles.

In use, initially the floor mat is approximately positioned in the front compartment area of the truck. Next, the vehicle's door sills are removed or at least lifted a sufficient distance to insert the retention tabs. Screws or other attachment means on the door sills are tightened to effectively trap the retention tabs. The floor mat will remain in place under normal use. The floor mat catches debris. The floor mat can be readily removed from the vehicle for cleaning purposes. All that is required is to loosen the door sill screws and vertically lift the floor mat out. Once cleaned, the mat is reinstalled. Alternatively, the floor mat is cleaned in place.

Optional features can be added to the full cover floor mats of the invention to enhance their use or appearance. For example, other center hump area configurations can be molded into the floor mat, including a 4-wheel drive gear shift cut-out and cup holders. Recessed area can be molded into the foot areas of the floor mat to receive and direct water such as from melted snow to peripheral areas so that shoes and pant cuffs are less likely to get wet. Back corner holes can be added (as seen in FIG. 1) to receive hook devices built into the truck's floor surface to even further enhance the retention of the mat in place.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A full cover floor mat for placement over a carpeted front interior surface of a vehicle for protecting the underlying carpet so as to remain securely in place without substantial floor slippage comprising a one piece pliable plastic mat having a driver foot area section, a front passenger foot area section, and a center hump area section with a tray molded thereinto for receiving coins and like sized objects, said one piece pliable plastic mat further molded to a contour and shape to fit snugly into a driver foot area, a front passenger foot area and a center hump area therebetween of the vehicle with a first lateral edge of the mat shaped for abutting against a driver door sill of the vehicle, an opposed second lateral edge of the mat shaped for abutting against a passenger door sill of the vehicle to substantially prevent side to side movement of the mat, a back edge of the mat contoured for abutting against seat attaching hardware of the vehicle to substantially prevent rearward movement of the mat and front portions of the mat vertically inclined for overlying a firewall of the vehicle to limit forward movement of the mat, said mat further having a retention tab extending outwardly from each of the lateral edges for fitting under the door sills of the vehicle, whereby the cover mat is physically restrained from slipping laterally, rearwardly and forwardly while in the vehicle.

2. The full cover floor mat of claim 1 wherein (i) the driver foot area section of the pliable plastic mat is defined by the first lateral edge, the back edge, a first crease substantially parallel to the first lateral edge and extending from the back edge to a front edge, (ii) the front passenger foot area section of the pliable plastic mat is defined by the second lateral edge, the back edge, a second crease substantially parallel to the second lateral edge and extending from the back edge to the front edge and (iii) the center hump area section of the pliable plastic mat is defined by the first crease, back edge, second crease and front edge.

3. The full cover floor mat of claim 2 further having a first raised wall molded into the driver foot area section near the first lateral edge and a second raised wall molded into the front passenger foot area section near the second lateral edge, each of said raised walls creating a tray in a central area of the driver foot area section and a tray in a central area of the front passenger foot area section for catching and retaining debris.

4. The full cover floor mat of claim 3 further wherein the driver foot area section has a vertically sloped wall extending from the tray in the central area to the front edge for overlying the firewall of the vehicle.

5. The full cover floor mat of claim 4 further wherein the front passenger foot area section has a vertically sloped wall extending from the tray in the central area to the front edge for overlying the firewall of the vehicle.

6. The full cover floor mat of claim 1 wherein the molded mat is made from a thermoplastic polyolefin.

7. The full cover floor mat of claim 1 wherein the center hump area section has a cut-out for receiving a gear shift of the vehicle.

* * * * *